(12) United States Patent
Knoop et al.

(10) Patent No.: US 7,308,351 B2
(45) Date of Patent: Dec. 11, 2007

(54) METHOD FOR COORDINATING A VEHICLE DYNAMICS CONTROL SYSTEM WITH AN ACTIVE NORMAL FORCE ADJUSTMENT SYSTEM

(75) Inventors: Michael Knoop, Ludwigsburg (DE); Martin Kieren, Schwieberdingen (DE); Andreas Schumann, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 10/875,472

(22) Filed: Jun. 23, 2004

(65) Prior Publication Data

US 2004/0267428 A1 Dec. 30, 2004

(30) Foreign Application Priority Data

Jun. 27, 2003 (DE) ............... 103 28 979

(51) Int. Cl.
*G06F 19/00* (2006.01)
(52) U.S. Cl. .............. 701/70; 701/36; 340/440; 324/300
(58) Field of Classification Search ............ 701/70, 701/36, 41, 124, 301; 702/141, 140; 340/436, 340/440, 465; 703/7, 8, 1; 324/300
See application file for complete search history.

(56) References Cited

U.S. PATENT DOCUMENTS

| | | | |
|---|---|---|---|
| 5,069,302 A | 12/1991 | Kageyama | 180/197 |
| 5,183,127 A | 2/1993 | Kageyama et al. | 180/197 |
| 5,247,831 A | 9/1993 | Fioravanti | 73/178 R |
| 5,517,414 A | 5/1996 | Hrovat | 701/91 |
| 5,696,677 A * | 12/1997 | Leaphart et al. | 701/37 |
| 5,747,682 A * | 5/1998 | Hirano | 73/118.1 |
| 6,053,584 A * | 4/2000 | Schunck et al. | 303/167 |
| 6,064,931 A | 5/2000 | Sawada et al. | 701/41 |
| 6,208,920 B1 | 3/2001 | Izawa et al. | 701/36 |
| 6,508,102 B1 * | 1/2003 | Margolis et al. | 73/8 |
| 6,754,615 B1 * | 6/2004 | Germann et al. | 703/8 |
| 6,909,957 B2 * | 6/2005 | Suissa | 701/82 |
| 2001/0035678 A1 * | 11/2001 | Miyazaki | 303/150 |
| 2003/0093201 A1 * | 5/2003 | Schubert et al. | 701/46 |
| 2003/0144767 A1 * | 7/2003 | Brachert et al. | 701/1 |
| 2003/0176961 A1 * | 9/2003 | Sauter et al. | 701/70 |
| 2003/0191572 A1 * | 10/2003 | Roll et al. | 701/70 |
| 2003/0225494 A1 * | 12/2003 | Coelingh et al. | 701/48 |
| 2003/0236606 A1 * | 12/2003 | Lu et al. | 701/70 |

FOREIGN PATENT DOCUMENTS

GB 2358163 7/2001

* cited by examiner

*Primary Examiner*—Tuan C To
(74) *Attorney, Agent, or Firm*—Kenyon & Kenyon LLP

(57) ABSTRACT

A vehicle dynamics control system for a motor vehicle having an active normal force adjustment system with which the normal force acting on a wheel may be adjusted is described. For coordinating the vehicle dynamics control system with the active normal force adjustment system, information about a change in the normal force is to be supplied to a control unit of the vehicle dynamics control system and may be taken into account in the vehicle dynamic control.

10 Claims, 3 Drawing Sheets

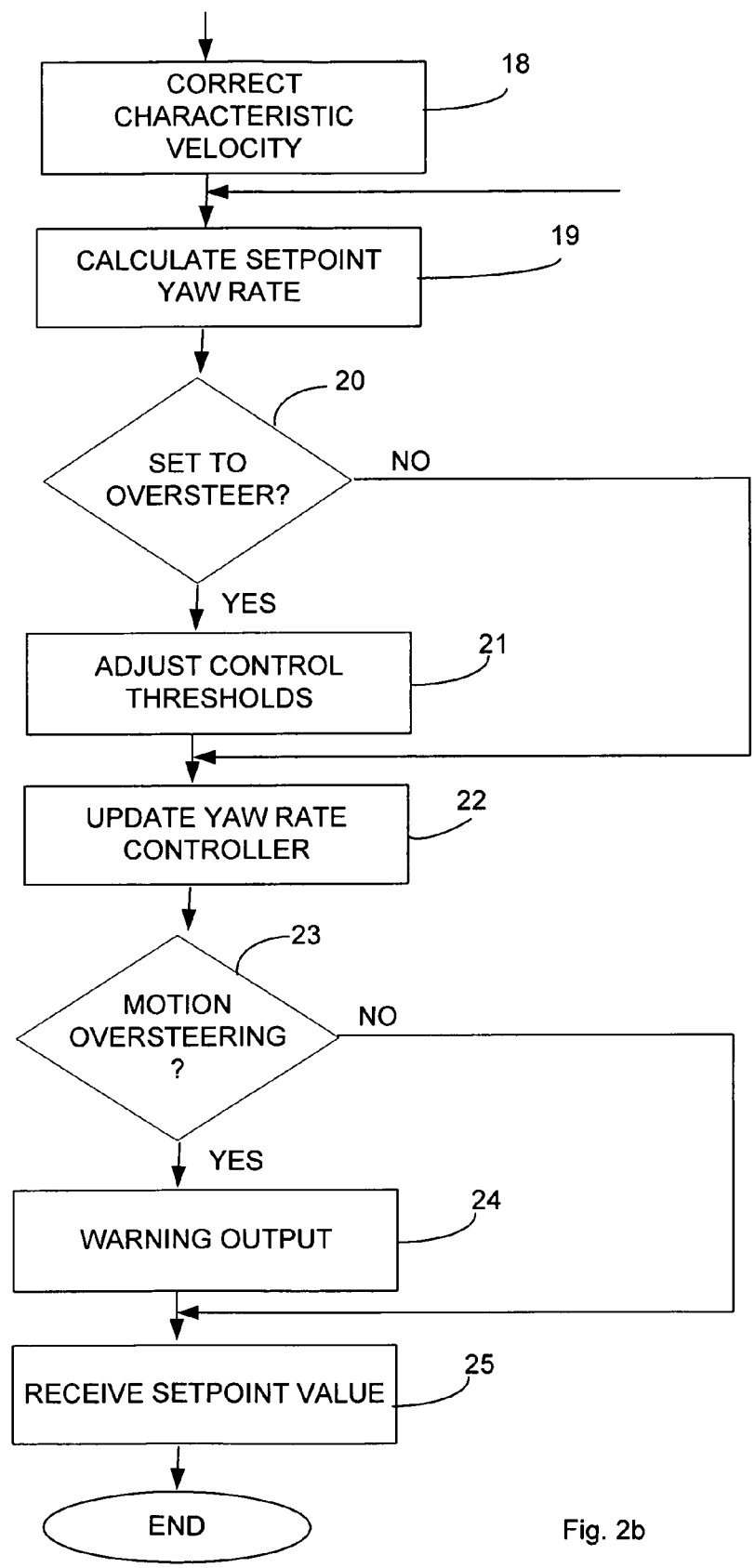

METHOD FOR COORDINATING A VEHICLE DYNAMICS CONTROL SYSTEM WITH AN ACTIVE NORMAL FORCE ADJUSTMENT SYSTEM

FIELD OF THE INVENTION

The present invention relates to a vehicle dynamics control system for a vehicle having an active normal force adjustment system, and a method for coordinating a vehicle dynamics control system with an active normal force adjustment system.

BACKGROUND INFORMATION

Vehicle dynamics control systems, understood to include all the devices that intervene in the driving operation via operation of brakes or drive such as ABS (anti-lock brake system), TCS (traction control system), ESP (electronic stability program) or MSR (engine drag torque control), help to stabilize motor vehicles in borderline situations in particular. To further improve controllability, vehicles are increasingly being equipped with active normal force adjustment systems, which are also referred to as spring-damper systems with which the normal force (wheel contact force) of a wheel is adjustable as a function of the driving situation. The function of the active normal force adjustment system such as CDC (continuous damper control) or ARC (active roll control) is to reduce vertical acceleration of the vehicle body and/or to compensate for the rolling motion of the vehicle when turning a corner and in horizontal leveling of the vehicle.

A two-channel ARC system has, for example, actuators on the front and rear axles which may be under tension independently of one another with respect to the passive state. However, when there is different tension on the front and rear axles, the normal forces (contact forces) on the wheels change. Because the lateral guidance force of the wheels increases only degressively as the normal force increases, the self-steering effect of the vehicle thus also changes. Depending on the setting of the normal force adjustment system, the vehicle thus exhibits either a more oversteering behavior or a more understeering behavior in comparison with the passive state. This has negative effects in particular on a vehicle dynamics control which is performed in parallel.

Vehicle dynamics control systems are usually based on a fixed self-steering effect. A self-steering effect altered by the normal force adjustment system may therefore result in faulty braking operations when the actual performance of the vehicle differs too much from the calculated setpoint performance.

In addition, the traction control implemented as part of the dynamics control is impaired. In order to adapt the brake slip controller to the particular driving situation, the normal forces acting on the wheels are usually estimated. Operation of the normal force adjustment system results in a deviation between the estimated and actual normal forces and may thus result in a malfunction of the traction control system.

SUMMARY

An object of the present invention is to create a method with which a vehicle dynamics control may be coordinated with a normal force adjustment system and to create a suitably adjusted vehicle dynamics control system.

In accordance with an example embodiment of the present invention, the vehicle dynamics control system is supplied with information about the change in at least one wheel normal force during operation of the normal force adjustment system, so that this information may be taken into account by the vehicle dynamics control system in performing its regulation. A vehicle dynamics control system and a normal force adjustment system may be coordinated optimally in this way, and faulty braking operation in particular on the part of the vehicle dynamics control system may be prevented.

The information about the change in the normal forces may be any information from which a change in normal forces, e.g., a change value, the absolute wheel contact force, etc., may be determined.

According to a first embodiment of the present invention, the information about the change in normal force is used to correct estimated normal forces. As part of a vehicle dynamics control, the normal forces acting on a wheel are usually estimated by a mathematical algorithm, e.g., from the transverse acceleration and the longitudinal acceleration of the vehicle. The estimated normal force values are preferably corrected by modifying the normal forces during operation of the normal force adjustment system. This yields the normal forces actually in effect, and then traction control, for example, may be performed on the basis of these values.

According to another embodiment of the present invention, the information about the change in normal forces is used to calculate one or more setpoint values for the transverse motion and yawing motion of the vehicle.

In the case of a vehicle dynamics control system having yaw rate regulation, a setpoint yaw rate is usually calculated, depending on a characteristic velocity, which in turn depends on the self-steering effect of the vehicle. The setpoint yaw rate is usually calculated using the Ackermann equation, which is also known by the term "single-track model." Using information about the change in normal force supplied by the normal force adjustment system, the characteristic velocity and thus the setpoint yaw rate may be adjusted accordingly.

In the case of a vehicle dynamics control system having float angle regulation, a setpoint value for the float angle is also determined in addition to or as an alternative to the setpoint yaw rate. The setpoint float angle may also be calculated using the single-track model. The parameters for calculating the setpoint float angle may be adjusted accordingly using the information about the change in normal force supplied by the normal force adjustment system.

According to another embodiment of the present invention, in the case of an oversteering adjustment of the normal force adjustment system—i.e., the vehicle exhibits oversteering behavior—an intervention threshold of the vehicle dynamics control is raised. A control intervention by the vehicle dynamics control is performed in this case only when there is a great system deviation in the controlled variable (e.g., yaw rate or float angle) so that unwanted brake operations in particular may be avoided.

The information about the change in normal force supplied by the normal force adjustment system is preferably monitored for plausibility. This makes it possible to prevent a wrong adjustment of the vehicle dynamics control system.

The present invention is explained in greater detail below on the basis of the accompanying Figures as examples.

BRIEF DESCRIPTION OF THE DRAWINGS

FIGS. 2a and 2b show a flow chart to illustrate the essential method steps in coordinating a vehicle dynamics control system with a normal force adjustment system.

DETAILED DESCRIPTION OF EXAMPLE EMBODIMENTS

Figure 1:
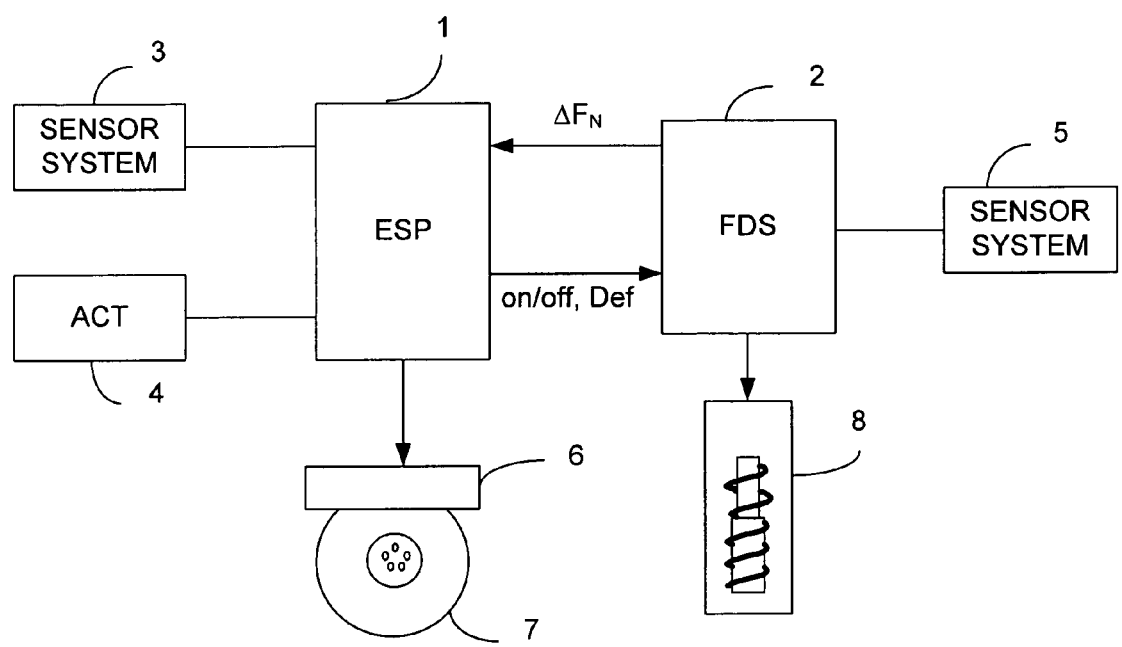
FIG. 1 shows a control system, including a vehicle dynamics control system and a normal force adjustment system.

FIG. 1 shows a schematic diagram of the system architecture of a complex control system, which includes a vehicle dynamics control system having components 1, 3, 4, 6 and a normal force adjustment system having components 2, 5, 8.

Vehicle dynamics control system 1, 3, 4, 6 includes a control unit 1 in which a control algorithm (ESP in the present case) is stored as a program module, a sensor system 3 for determining the controller input variables (actual performance) and multiple final controlling elements 4, 6 such as, for example, an engine control unit, a steering controller, etc., and a wheel brake 6 for influencing the driving performance. When a predetermined intervention threshold is exceeded, i.e., a predetermined system deviation of the vehicle occurs, brake 6, for example, is operated to adapt the yaw performance of the vehicle to the setpoint and to thus stabilize the vehicle.

Normal force adjustment system 2, 5, 8 includes a second control unit 2 connected to a sensor system 5 for measuring various state variables and an actuator 8 (active spring-damper element). (Alternatively the vehicle dynamics control algorithm and the normal force adjustment algorithm may also be implemented in a single control unit. The interface is then inside the control unit.) Actuator 8 may be operated by control unit 2 to change the normal force of a wheel 7. This is used in particular to reduce the vertical acceleration of the vehicle body, to compensate for a rolling motion of the vehicle when turning a corner and/or for horizontal leveling of the vehicle.

Vehicle dynamics control system 1, 3, 4, 6 determines normal forces $F_N$ acting on wheels 7 for implementing a yaw rate regulation, for example. These forces are usually estimated on the basis of the transverse and longitudinal acceleration of the vehicle, the acceleration values being input by sensors or determined by an estimation method. When there is a change in the normal forces due to operation of normal force adjustment system 2, 5, 8, vehicle dynamics control system 1, 3, 4, 6 must be adjusted accordingly.

Changes in normal force $\Delta F_{N,XY}$ (XY=left front (VL), right front (VR), left rear (HL), right rear (HR)), which are provided by normal force adjustment system 2, 5, 8, are supplied to ESP control unit 1 for this purpose.

In the case of a normal force adjustment system 2, 5, 8 having only one actuator 8 per axle, it is sufficient if only one signal for the change in normal force $\Delta F_{N,XY}$ is transmitted to control unit 1 for each axle, because changes in normal force $\Delta F_{N,XY}$ on the left and the right have the same absolute value but different signs. In this case it holds that:

$$\Delta F_{N,VL} = -\Delta F_{N,VR}; \Delta F_{N,HL} = -\Delta F_{N,HR} \qquad (1)$$

Optionally some other information, which may yield the changes in normal force $\Delta F_{N,XY}$, could be transmitted to ESP control unit 1.

Normal force signals $\Delta F_{N,XY}$ transmitted are preferably monitored for plausibility. This makes it possible to prevent incorrect adaptation of vehicle dynamics control system 1, 3, 4, 8 when there are faulty signals or a faulty transmission.

For monitoring normal force change signals $\Delta F_N$, standard tests such as time-out monitoring, exceeding an admissible range, or exceeding a maximum change gradient could be performed.

In addition, long-term monitoring is preferably performed on the basis of the sum of the changes in normal force over all wheels 7. Since the sum of normal forces $F_{N,XY}$ is equal to the force due to weight of the vehicle when averaged over time, the sum of changes in normal force $\Delta F_{N,XY}$ must be equal to zero when averaged over time. It thus holds that:

$$\Delta F_{N,sum} = \Delta F_{N,VL} + \Delta F_{N,VR} + \Delta F_{N,HL} + F_{N,HR} = 0 \qquad (2)$$

Summation signal $\Delta F_{N,sum}$ is preferably low-pass filtered:

$$\Delta F_{N,sum,filt} = TP\{\Delta F_{N,sum}\} \qquad (3)$$

A fault is recognized as soon as the filtered signal exceeds a predetermined threshold $C_1$ in absolute value, where the following holds:

$$|\Delta F_{N,sum,filt}| > C_1 \qquad (4)$$

In a normal force adjustment system 2, 5, 8 having only two actuators on the front and rear axles, long-term monitoring cannot be performed because the condition is satisfied here generically. The information provided by normal force adjustment system 2, 5, 8 about the change in normal force $\Delta F_{N,XY}$ may be taken into account by vehicle dynamics control system 1, 3, 4, 6 in different ways:

The information may first be used to correct normal forces $F^0_{N,XY}$ estimated by control unit 1:

$$F_{N,XY} = F^0_{N,XY} + \Delta F_{N,XY} \qquad (5)$$

Corrected normal forces $F_{N,XY}$ are made available to the brake slip controller in particular.

Secondly, the information may be used to correct the computation of a setpoint yaw rate during a yaw rate control.

The setpoint yaw rate has been calculated from vehicle velocity v and wheel steering angle $\delta_v$ as variables, as well as wheelbase L and self-steering parameter $v_{ch}$ (characteristic velocity) as constant application parameters. As a rule, this is carried out by using the Ackermann equation, also known as the "single-track model":

$$d\Psi_{setpoint}/dt = \frac{1}{L} \cdot \frac{v}{1+(v/v_{ch})^2} \cdot \tan\delta_v \qquad (6)$$

To take the altered self-steering effect of the vehicle into account, changes in normal force $\Delta F_{N,XY}$ and transverse acceleration $a_y$ enter into the computation of setpoint yaw rate $d\psi_{setpoint}/dt$ where it holds that:

$$d\Psi_{setpoint}/dt = f(V, \delta_v, a_y, \Delta F_{N,XY}) \qquad (7)$$

Characteristic velocity $v_{ch}$ is regarded here as a variable which depends on changes in normal force $\Delta F_{N,XY}$:

$$v_{ch} = f(a_y, \Delta F_{N,XY}) \qquad (8)$$

The self-steering effect depends on the difference between the displacements of normal force acing on the front axle and the rear axle:

$$\Delta F_d = (\Delta F_{N,VL} - \Delta F_{N,VR}) - (\Delta F_{N,HL} - \Delta F_{N,HR}) \qquad (9)$$

Thus the following holds for characteristic velocity $v_{ch}$:

$$v_{ch} = v_{ch}^0 * (1 - K * a_y * \Delta F_d) \qquad (10)$$

Application parameter $v_{ch}^0$ is a constant (without normal force intervention) and K is an influencing factor in the case of a normal force intervention.

To determine parameters $v_{ch}^0$ and K, for example, driving in a circle may be performed under predefined conditions. Normal force adjustment system 2, 5, 8 is adjusted to different values of $\Delta F_d$ in a test series. Factor K and/or characteristic curve γ (see equation 11) may thus be determined on the basis of measurements of steering angle $\delta_v$ at the wheel, driving speed v, yaw rate dψ/dt, and transverse acceleration $a_y$.

Instead of the linear approximation equation according to equation 10, the characteristic velocity may also be represented as function γ whose interpolation points are given by the product $a_y * \Delta F_d$:

$$v_{ch} = v_{ch}^0 * \gamma(a_y * \Delta F_d) \tag{11}$$

The vehicle may also be adjusted to oversteer by a corresponding adjustment of normal force adjustment system 2, 5, 8. In this range, the Ackermann equation (6) is no longer valid because it only describes the yaw rate in understeering behavior. To nevertheless obtain useful values for the setpoint yaw rate, a very high value is selected for characteristic velocity $v_{ch}$. This describes an approximately neutral self-steering effect. In addition, the intervention threshold of the yaw rate controller is preferably widened, i.e., regulation is performed only at a greater system deviation. The intervention threshold of the yaw rate controller is preferably a function of changes in normal force $\Delta F_{N,XY}$:

$$d\Psi_{threshold}/dt = f(a_y, \Delta F_{N,XY}) \tag{12}$$

By analogy with equation 11, this may also be represented in the form of a characteristic curve T:

$$d\Psi_{threshold}/dt = T(a_y * \Delta F_D) \tag{13}$$

Normal force adjustment system 2, 5, 8 may also be triggered by vehicle dynamics control system 1, 3, 4, 6 to adjust the normal force distribution in the desired manner. Vehicle dynamics control system 1, 3, 4, 6 may request normal force adjustment system 2, 5, 8 to set, for example, a neutral position via a suitable signal. Control unit 1 transmits a signal Def to normal force adjustment system control unit 2 for this purpose.

During transmission of a faulty normal force change signal $\Delta F_{N,XY}$, the normal force change values $\Delta F_N$ that are input are preferably not taken into account by vehicle dynamics control system 1. In this case regulation is performed on the basis of preset values, for example. Normal force adjustment system 2, 5, 8 is also requested to switch to a passive state, i.e., the changes in normal force are reduced to zero.

Figure 2A:
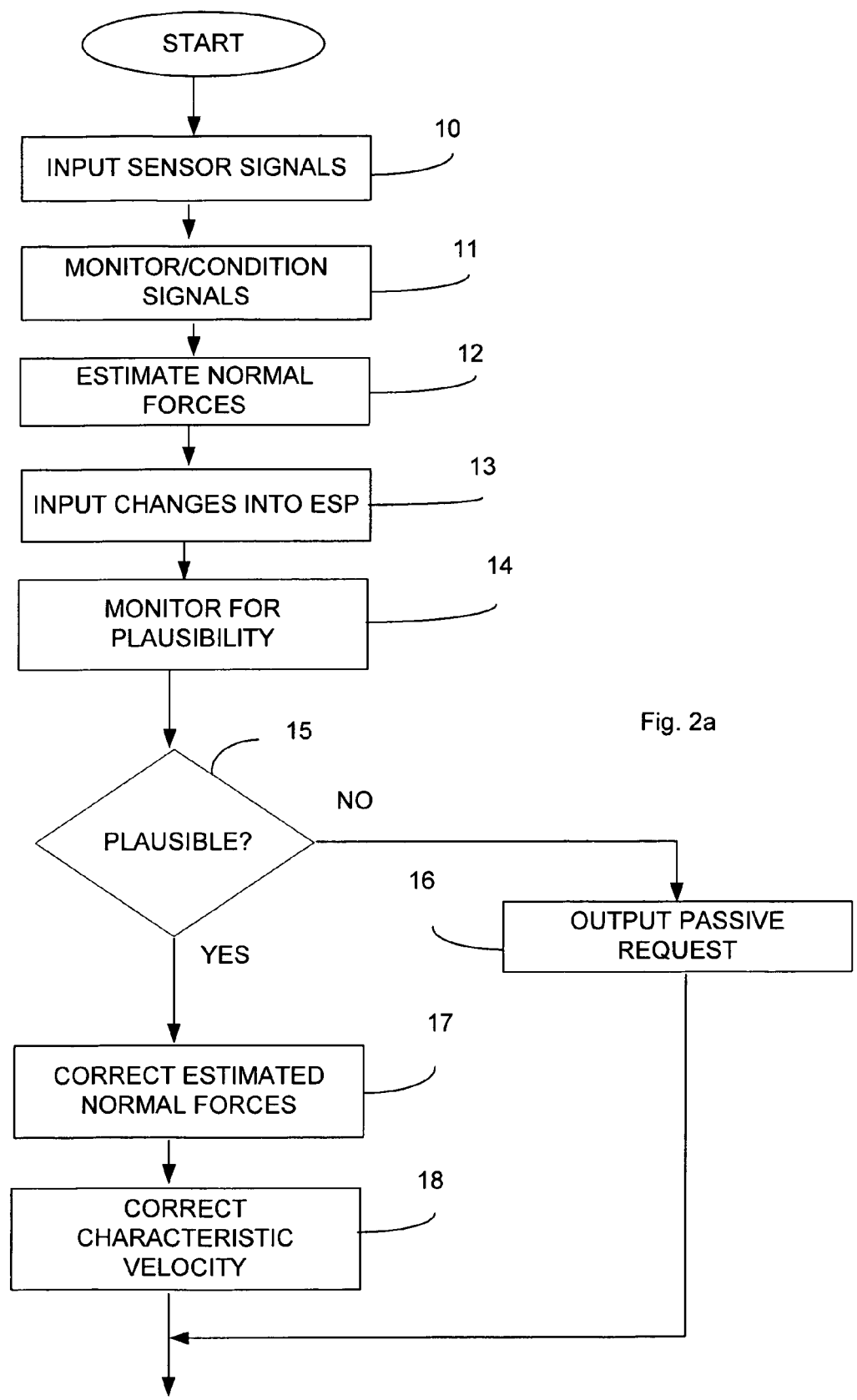

FIGS. 2a and 2b show a flow chart depicting the essential method steps in coordinating a vehicle dynamics control system with a normal force adjustment system 2, 5, 8. The method steps known from the related art are depicted in the form of non-hatched blocks and the newly added method steps are depicted in the form of hatched blocks.

In a first method step 10, the sensor signals of sensor system 3 are first input by ESP control unit 1 and in step 11 they are monitored and conditioned. In step 12, normal forces $\Delta F^0_{N,XY}$ are estimated. In step 13 changes in normal force $\Delta F_{N,XY}$ which are supplied by control unit 2 of normal force adjustment system 2, 5, 8 are then input into ESP control unit 1 and in step 14 they are monitored for plausibility.

A check is performed in step 15 to determine whether the changes in normal force are plausible (yes) or not (no). If yes, estimated normal forces $F^0_{N,XY}$ are corrected by changes in normal force $\Delta F_{N,XY}$ (step 17). If the changes in normal force $\Delta F_{N,XY}$ that have been input are not plausible, ESP control unit 1 outputs a passivation request to control unit 2 (step 16) causing normal force adjustment system 2, 5, 8 to switch to a normal position.

In the case of plausible values $\Delta F_{N,XY}$ characteristic velocity $v_{ch}$ is also corrected in step 18 according to equation 10 or 11.

In step 19 a setpoint yaw rate $d\psi_{setpoint}/dt$ is calculated according to equation 6. In addition, a check is performed in step 20 to determine whether normal force adjustment system 2, 5, 8 is set to oversteer. If the answer is yes, then in step 21 the control thresholds are adjusted as a function of the normal forces. If the answer is no, there is no adjustment of the control thresholds.

The yaw rate controller contained in control unit 1 is updated accordingly in step 22.

A check is performed in step 23 to determine whether or not the motion of the vehicle is oversteering. If the answer is yes, then in step 24 an oversteering warning is output to control unit 2 of normal force adjustment system 2, 5, 8, causing normal force adjustment system 2, 5, 8 to perform a neutral or understeering adjustment. If the answer is no, no oversteering warning is output. Finally, in step 25, the brake slip controller and other controllers receive the particular setpoint values from the yaw rate controller.

LIST OF REFERENCE NOTATION

1 ESP control unit
2 normal force adjustment system control unit
3 ESP sensor system
4 actuators
5 normal force adjustment system sensors
6 wheel brake
7 wheel
8 actuator
10-25 method steps
$\Delta F_N$ change in normal force

What is claimed is:

1. A vehicle dynamics control system for a vehicle, comprising:
   an active normal force adjustment system for changing a normal force acting on a wheel; and
   a vehicle dynamics control system in communication with the active normal force adjustment system,
   wherein the active normal force adjustment system is configured to supply information about a change in the normal force to the vehicle dynamic control system, the information about the change in normal force is taken into account in calculating a setpoint value, wherein the setpoint value is a setpoint yaw rate usable to regulate the transverse dynamic of the vehicle, the vehicle dynamics control system configured to take the supplied information into account in regulating the vehicle, and
   wherein the setpoint yaw rate is calculated using a single-track model in which a self-steering parameter, characteristic velocity $v_{ch}$, is determined as a function of the information about the change in the normal force.

2. The vehicle dynamics control system as recited in claim 1, wherein the normal forces acting on the wheel are estimated by using a mathematical model, and the estimated normal forces are corrected based on the information supplied about the changes in normal force.

3. The vehicle dynamics control system as recited in claim 1, wherein an intervention threshold of the vehicle dynamics control is adjusted as a function of the information about the change in the normal force.

4. The vehicle dynamics control system as recited in claim 1, wherein the vehicle dynamics control system monitors the information about the change in normal force for plausibility.

5. The vehicle dynamics control system as recited in claim 1, wherein the vehicle dynamics control system is configured so that the active normal force adjustment system is triggerable.

6. The vehicle dynamics control system of claim 1, wherein the information about the change in normal force is taken into account in calculating a second setpoint value, which is a setpoint float angle usable to regulate the float angle of the vehicle.

7. The vehicle dynamics control system of claim 4, wherein the vehicle dynamics control system monitors the information about the change in normal force for plausibility by performing long-term monitoring of the change in normal force, the long-term monitoring determining if a sum of the change in normal forces over all wheels of the vehicle equals zero when averaged over time.

8. The vehicle dynamics control system of claim 4, wherein if the vehicle dynamics control system determines the change in normal force is not plausible, the vehicle dynamics control system outputs a passivation request to the active normal force adjustment system.

9. The vehicle dynamics control system of claim 7, wherein the passivation request triggers the active normal force adjustment system to provide zero change to the normal force acting on the wheel.

10. The vehicle dynamics control system of claim 3, wherein the intervention threshold of the vehicle dynamics control is adjusted if the active normal force adjustment system is being used to oversteer the vehicle.

* * * * *